United States Patent [19]

Masuda et al.

[11] Patent Number: 4,848,673
[45] Date of Patent: Jul. 18, 1989

[54] FLUIDIZED GRANULATING AND COATING APPARATUS AND METHOD

[75] Inventors: Yoshinori Masuda, Yaizu; Masaharu Motoi, Fujieda, both of Japan

[73] Assignee: Freund Industrial Co., Ltd., Japan

[21] Appl. No.: 215,048

[22] Filed: Jul. 5, 1988

Related U.S. Application Data

[63] Continuation of Ser. No. 935,314, Oct. 30, 1986, abandoned.

[30] Foreign Application Priority Data

Mar. 1, 1985 [JP] Japan ................................ 60-41597

[51] Int. Cl.4 .............................................. B02C 19/00
[52] U.S. Cl. ........................................ 241/5; 241/23; 241/33; 241/39; 241/65; 427/213
[58] Field of Search .................. 241/30, 33, 5, 34, 39, 241/40, 62, 101.1, 57, 23, 65; 71/64.06, 64.07; 34/57 A; 159/DIG. 3; 366/101, 107; 423/DIG. 16; 427/213

[56] References Cited

U.S. PATENT DOCUMENTS 4,532,155 7/1985 Golant et al. .

FOREIGN PATENT DOCUMENTS 49-299 12/1974 Japan .
75674 6/1976 Japan .

Primary Examiner—Mark Rosenbaum
Attorney, Agent, or Firm—Kane, Dalsimer, Sullivan, Kurucz, Levy, Eisele and Richard

[57] ABSTRACT

A fluidized granulating and coating apparatus having a cylindrical treating vessel provided with at least one spray nozzle, at least one air supply duct and one exhaust duct, and a downwardly converging frusto-conical portion. The spray nozzle is disposed at a position below the interface of the fluidized particles within the region of the frusto-conical portion. At least one compressed air nozzle is disposed at a level below the interface of the fluidized particles and within the range of the frusto-conical portion. Disclosed also is a fluidized granulating and coating method which makes use of this apparatus. With the apparatus and the method of the invention, it is possible to produce granular products such as a slow-effecting or long-lasting pharmaceutical product with a high quality and homogeneity at a high yield, by coating cores of spherical granules with a coating composition containing the medical component of the desired property.

13 Claims, 7 Drawing Sheets

FLUIDIZED GRANULATING AND COATING APPARATUS AND METHOD

This is a continuation, of application Ser. No. 935,314, filed Oct. 30, 1986, now abandoned.

FIELD OF THE INVENTION

The present invention relates to a fluidized granulating and coating apparatus for producing coated granules, as well as a method for producing such granules using the apparatus. More particularly, the present invention is concerned with a fluidized granulating and coating apparatus, as well as a method, capable of producing coated granules of a high quality and homogeneity at a high yield.

The present invention offers a remarkable improvement in the coating rate of granules, particularly spherical granules, and is applicable to fluidized granulating and coating process for producing granules with various types of coating such as sugar coating, color coating, enteric coating, quick-soluble coating, slow-effecting coating, and long-lasting coating.

Background Art

It is well known that particles containing medical substances or particles as materials of foodstuffs are granulated by, for example, a fluidized granulating process. These granules are then treated in a fluidized condition so as to obtain a coating of a required property, such as sugar coating, color coating and so forth. It has also been known that the thus produced coated granules are used as phramaceutical or food products.

On the other hand, medical drug design is attracting attention in which cores such as particles of inert granules, e.g., cane sugar, milk sugar, corn starch or the like, are coated with a coating composition having a specific medical composition, in order to meet the current demands for slow-effecting drugs or long-lasting drugs. Such a technique is shown, for example, in Japanese Patent Publication No. 33677/1970.

Hitherto, various fluidized granulating and coating apparatus have been proposed. A typical one of such apparatus incorporates a solid-air fluidized bed as shown in FIG. 7. Also known is an apparatus of a continuous processing type which performs not only the granulation and coating but also mixing and drying.

More specifically, the apparatus shown in FIG. 7 has a treating vessel 30 which includes a frusto-conical portion 30a which converges downward, a bag filter 35, and a spray nozzle or a spray gun 37. A air supply duct 31 is connected to the bottom of the treating vessel 10, while a air exhausting duct 32 is connected to the upper side of the vessel 10. An air-flow stabilizing plate 33 is interposed between the treating vessel 30 and the air supply duct 31 so as to separate the duct 31 and a granulating/coating chamber 34 in the treating vessel 30. The bag filter 35 provided in the upper portion of the treating vessel 30 separates the granulating/coating chamber 34 and a chamber 36 to which the air exhaust duct 32 is connected. The spary nozzle 37 disposed in the granulating/coating chamber is positioned at a level below the bag filter 35 substantially at the center of the treating vessel 30 and directed downwardly. The spray nozzle 37 is adapted to spray a binder or a coating liquid into the granulating/coating chamber 34. On the other hand, air flows as indicated by one-dot-and-dash line arrows so that the material particles are blown and fluidized within the granulating/coating chamber 34 as indicated by the solid-line arrows. As a solution, e.g., a binder, is sprayed from the nozzle 37, the particles are bound together to form granules. This operation is continued for a predetermined time so that granules as the product are formed. Then, a damper 38 on the exhaust side of the vessel is closed so that the granules drop onto the air-flow stabilizing plate 33 so as to be accumulated on the latter. In FIG. 7, reference numerals 39 and 40 denote a heater and a filter, respectively.

This apparatus can serve also as a coating apparatus. To such an end, a coating composition is dissolved in a solvent which evaporates comparatively quick so as to form a solution which is sprayed into the granulating/coating chamber 34 so as to coat the particles or granules which form a fluidized bed within the chamber 34.

In the conventional apparatus, the spray nozzle 37 is disposed within the treating vessel and is oriented such that it sprays the solution downwardly. Namely, the spray nozzle 37 is disposed at a comparatively high position within the granulating/coating chamber 34 so as to spray the binder or the coating liquid downwardly. In some cases, the apparatus employs spray nozzles which are secured to upper portions of the walls defining the treating vessel so as to direct the spray obliquely downwardly, besides the central spray nozzle which directs the spray vertically downwardly.

Apparatus has also been proposed in which the spray nozzle is provided on the bottom of the treating vessel or under the air supply port in the air supply duct, so as to direct the spray upwardly. An example of this type of apparatus is disclosed, for example, in an article entitled "FLUIDIZED BED GRANULATING AND COATING APPARATUS" in "Chemical Factories" Vol. 24, No. 5, pp 51–59 (1980), as well as in Japanese Unexamined Patent Laid-Open No. 73042/1984.

On the other hand, Japanese Patent Publication No. 44268/1979 discloses an apparatus which has a funnel-like construction constituted by an inversed-conical body portion with a conical side wall and a bottom plate constituted by a porous plate, and a leg portion which constitutes a gas jetting pipe. This apparatus also has a coating agent supply pipe which projects upward to a region near the outlet of the gas jetting pipe so that the coating agent is supplied to the fluidized bed.

In a related art shown in Japanese Utility Model Publication No. 14914/1976, a spray device is pivotally secured to the wall of a vessel such that the spray device can swing through an angle $\theta_1$ of 0° to 60° with respect to a horizontal axis and through an angle $\theta_2$ of 0° to 150° with respect to a vertical axis. This spray device may be arranged such that it can spray a solution obliquely upwardly.

Technical Subjects

With the arrangement in which the solution is sprayed vertically downwardly or obliquely downward from a nozzle or nozzles attached to the upper mid portion of the vessel or upper portions of walls defining the vessel, a problem is encountered in that the spray pattern is inevitably changed as a result of deposition of the fluidized particles or sprayed solution on the spray nozzle. In addition, the droplets of the sprayed solution are dried by the fluidizing air and attach to the particles so as to be scattered before they effectively coat the granules. In addition, a considerably large part of the sprayed solution is scattered without being utilized, due to the fact that the probability of contact between the droplets of the sprayed solution and the particles is impractically small. These problems are unavoidable even when the spray nozzle which is directed downwardly is immersed in the fluidized bed of the particles. The problems are more severe in the case of coating of the granules, particularly when the granules to be coated are spherical granules. Namely, in such a case, the spherical granules which have considerably large weight cannot be fluidized sufficiently within the treating vessel, unlike the case of the particles. In consequence, the granules are concentrated mainly to a region below the middle level within the vessel, and the concentration of the granules is increased particularly in the peripheral portion of the frusto-conical body which converged downwardly. The fluidized bed would be raised by increasing the pressure and flow rate of the fluidizing air. Such a method, however, causes the coating solution to be scattered to deform the spray pattern, with the result that the coating is rendered unstable. Another problem encountered by the conventional apparatus having a spray nozzle disposed at a high position within the treating vessel is that, since the distance between the nozzle and the spherical granules is large, the sprayed liquid is dried to become powder before it reaches the surfaces of the granules, so as to be scattered without contributing to the coating. Each of the spherical granule have a considerably large surface area, in contrast to fine powders. Therefore, if the granules are not fluidized sufficiently, they are coated only partially or the coating operation is rendered unstable.

On the other hand, the following problems are encountered with the apparatus having an upwardly directed spray nozzle situated on the bottom of the treating vessel or under the air supply port, as well as with the apparatus in which, as disclosed in Japanese Patent Publication No. 44268/1979, a coating agent supply pipe projects to the region near the fluidized bed so as to spray a coating agent. Namely, in these apparatus, the temperature of the fluidized air is considerably high because of the necessity for the coating, so that the drying and scattering of the coating agent is unavoidable. The drying and scattering of the sprayed solution are also promoted by the blow of the atomizing air. This undesirably restricts the range over which the flow rate of the atomizing air is controlled, tending to promote the aggregation or massing of the particles. The spray nozzle situated on the bottom of the treating vessel tends to suffer from deposition of the particles thereon, resulting in a variation in the spray pattern thus failing to perform a stable coating operation.

The apparatus disclosed in Japanese Utility Model Publication No. 14914/1976 includes a display device secured to a vertical portion of the cylindrical wall of the vessel which is known per se, wherein the angle of spray is adjustable within given ranges of angle. This apparatus, therefore, suffers from the problem which is encountered with the apparatus incorporating the spray nozzle which directs the spray obliquely downwardly. In addition, since this apparatus has no frusto-conical portion which converges downward, the fluidized bed cannot be formed with high uniformity of the particles, resulting in an unstable coating and greater tendency for aggregation and massing.

The art shown in Japanese Patent Laid-Open No. 73041/1984 suffers the same problem as Japanese Patent Publication No. 44268/1979 because it employs the supply of the sprayed solution directly to the fluidized bed. This art also encounters the problem explained in connection with Japanese Patent Publication No. 44268/1979, i.e., drying and scattering of the sprayed solution, blowing by the atomizing air, and aggregation or massing.

As will be realized from the foregoing description, the known arts suffer from the problems concerning scattering of the sprayed binder or coating solution by the action of the fluidizing air, and lack the stability of the coating operation. In particular, it is almost impossible to produce coated granules of a high quality and homogeneity, particularly when the granules are spherical granules, however the coating time may be prolonged. In addition, some of these known arts suffers from low yield and degradation in the quality resulting in a loss from an economical point of view, due to the aggregation of the particles.

With these known arts, it is extremely difficult to produce pharmaceutical products with slow-effecting or long-lasting coating which is strictly required to be of high quality and homogeneity.

In another related art known as centrifugal fluidized granulating and coating apparatus, a ventilating rotary plate is disposed in a treating vessel. This apparatus has a frusto-conical portion which converges downwardly and a cylindrical vertical portion through which a solution is supplied. This apparatus, however, is not so relevant insofar as it relies upon the operation of the rotary plate. In addition, this apparatus suffers the same problem as that encountered with the apparatus shown in Japanese Utility Model Publication No. 14914/1976, because the spray nozzle is provided within the vertical portion in which the particles are not fluidized uniformly. In addition, since the fluidizing air is supplied through a slit, problems such as drying of the atomized solution, reduction in the coating rate occurs inevitably, as well as aggregation of the particles. It is to be noted that this problem is encountered also with the art disclosed in Japanese Patent Laid-Open No. 171429/1982, as well as the art shown in Pharmacentische Industry 41 (10), 973–976 (1979).

The problems discussed heretofore are caused as synthetic effect of various factors such as the condition of fluidizing of particles, properties of the coating solution or binder, and conditions of supply of the coating solution or the binder, and are serious particularly in the coating of spherical granules. Unfortunately, these problems could not be overcome merely by improving or eliminating these factors.

Disclosure of the Invention

Accordingly, an object of the invention is to provide a fluidized granulating and coating apparatus and method wich ensure high stability of the coating operation even on spherical granules, thereby overcoming the above-described problems of the prior art.

In order to obviate the problems of the prior art, the present invention proposes the following technical measures. Referring to the drawings showing embodiments of the invention, particularly to FIG. 1, the apparatus of the invention employs a spray nozzle 4 which is provided in a downwardly converging frusto-conical portion 2 of a vessel, below the level of the interface of the fluidized granules, particularly spherical granules. The term "downwardly converging frusto-conical portion" is used to mean the region denoted by a symbol A in FIG. 1. However, it is not essential that the spray nozzle is provided on the wall of the frusto-conical portion. Namely, all that is required is that the spray is directed to a zone in which the granules or particles are fluidized uniformly at a high concentration.

In another form of the present invention, a nozzle 15 for jetting compressed air is disposed on the frusto-conical portion (region A) below the interface of the fluidized granules, particularly the spherical granules, in addition to a spray nozzle 4 which is disposed, as in the embodiment shown in FIG. 1, on the frusto-conical portion 2 of the treating vessel below the interface of the fluidized granules.

In still another form of the present invention shown in FIGS. 3 and 4, a spray nozzle 4 is disposed on the frusto-conical portion 2 below the interface of the fluidized granules, particularly spherical granules, as in the arrangement shown in FIG. 1, and a nozzle 15 for compressed air is disposed on the frusto-conical portion 2 below the interface of the fluidized granules, particularly spherical granules, as in the arrangement shown in FIG. 2. Furthermore, a temperature measuring element is disposed in (1) a conduit of compressed air connected to the spray nozzle 4 and upstream of the fluidized granulating and coating apparatus, (2) in the fluidized bed of the granules and/or (3) in a conduit connected to the compressed air nozzle and upstream of the fluidized granulating and coating apparatus.

Operation

Conventional fluidized granulating and coating apparatus has a common feature that the coating solution or the binder is sprayed directly into the portion of the fluidized bed where the granule concentration is comparatively low. It is considered that this common feature constitutes one of the major reasons of the low efficiency of coating on granules, particularly spherical granules, in the conventional fluidized granulating and coating apparatus.

In the fluidized granulating and coating apparatus of the kind described, as will be readily understood from the flow pattern in these apparatus, the concentration of the particles or granules is comparatively low in the zone near the outlet of the fluidizing air where the air flow velocity is specifically high, as well as in the zone near the interface of the fluidized particles or granules. In contrast, a fluidized bed of a high density of the particles or granules is formed in the zone where the velocity of the fluidizing air is low to allow the particles or granules to fall. Therefore, in a fluidized granulating and coating apparatus having a cylindrical treating vessel with a downwardly converging frusto-conical lower portion, a uniform flow of the particles or granules is obtained in the region near the peripheral wall of the frusto-conical portion as shown in FIG. 7. In this region, the velocity of the fluidizing air is comparatively low and the particles and aggregates gather at a comparatively high density.

In contrast to the common understanding, the present invention proposes to directly spray the coating solution or the binder into the region where the density of the fluidized particles is maximized.

With such an arrangement, the efficiency of coating on granules, particularly spherical granules, is remarkably improved.

More specifically, according to the invention, the coating solution or the binder is directly sprayed into the region where the granules, particularly spherical granules, are fluidized homogeneously at a high density, so that the probability of the contact between the droplets of the sprayed solution and the particles or granules is remarkably increased, while suppressing the drying and scattering of the sprayed solution by the fluidizing air, thus enabling an efficient granulation or coating in a short time so as to attain a high yield without suffering from any uneven coating.

Furthermore, since the spray nozzle is disposed on the frusto-conical portion of the treating vessel, the spray nozzle is effectively cleaned by the particles which are recirculated through the treating vessel, so as to suppress any change in the spray pattern thereby ensuring high stability of the granulating and coating operation. The contamination of the spray nozzle is not so heavy because the spray nozzle is not disposed on the bottom of the treating vessel.

It is to be noted also that the influences of factors such as air pressure, air flow rate and temperature are suppressed as compared with conventional apparatus, so that these factors can be controlled over wider ranges, thus facilitating the control of operation of the apparatus. In addition, undesirable aggregation or massing of particles is remarkably suppressed by enhancing the air pressure and air flow rate. The atomizing air supplied through the spray nozzle produces an additional effect that the aggregates of the particles are suitably broken into smaller sizes, thus allowing a control of the sizes of the granules. This makes it possible to conduct the coating immediately after the granulation, without requiring classification of the particles according to the sizes. Furthermore, it is possible to prevent aggregation and massing of particles by suitably controlling the flow rate and pressure of the atomizing air from the compressed air nozzle.

Figure 1:
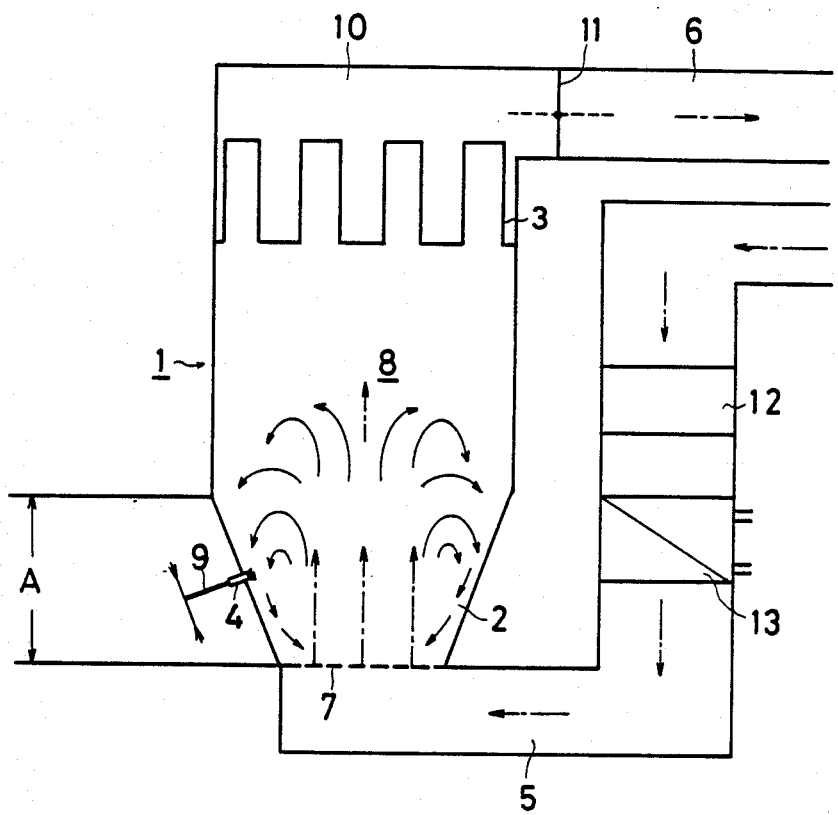
FIG. 1 is a sectional view of an embodiment of the present invention.

In these Figures, reference numeral 1 denotes a fluidized granulating and coating apparatus, 2 denotes a frusto-conical portion, 3 and 12 denote flters, 4 denotes a spray nozzle, 5 denotes an air supply duct, 6 denotes an exhaust duct, 8 denoted a granulating/coating chamber, 9,16 denote conduits, 13 denotes a heater, 15 denotes a compressed air nozzle, 17 denotes an air humidity controller, 18 denotes a heater (cooler), 19, 20 denote temperature measuring elements, 21 denotes a compressed air heater (cooler), 22 denotes a dehumidifier (cooler), 23 denotes a compressor, 24, 25 denote signal generators, 26 denotes a temperature sensing controller, 27 denotes a granulation/coating controller, and 28 denotes a conduit.

THE BEST MODE FOR CARRYING OUT THE INVENTION

Embodiments of the invention will be described hereinunder with reference to the accompanying drawings. It is to be noted, however, the constituent parts and other members and arrangements thereof described hereinafter are only illustrative and are not intended for limiting the scope of the invention.

FIG. 1 is a sectional view of an embodiment of the present invention. Although the following description mentions specifically a coating process for coating spherical granules, it is to be noted that the invention is applicable also to a granulating process.

Referring to FIG. 1, a treating vessel 1 is provided with a frusto-conical portion 2, a bag filter 3 and a spray nozzle 4. An air supply duct 5 is connected to the bottom of the treating vessel 1, while an exhaust duct 6 is connected to an upper portion of the same. An air-flow stabilizing plate 7 constituted by a porous plate is disposed between the treating vessel 1 and the air supply duct 5. The air-flow stabilizing plate 7 separates the air-supply duct 5 and a granulating/coating chamber 8 from each other. The bag filter 3 is disposed in an upper portion of the treating vessel so as to separate the granulating/coating chamber 8 from a chamber 10 to which the air exhaust duct 6 is connected. A spray nozzle 4 is disposed in the granulating/coating chamber 8 at a level below the interface of the fluidized spherical granules. More specifically, the spray nozzle 4 is disposed within the region of the frusto-conical portion 2. Atomizing air and a solution, e.g., a coating solution, are supplied to the spray nozzle 4 through a conduit 9 and a constant flow-rate pump (not shown), so that the coating solution is atomized into the granulating/coating chamber 8. In the described embodiment, the nozzle 4 is directed upwardly, i.e., above the horizontal plane. This orientation of the spray nozzle 4, however, is not exclusive and the nozzle 4 may be directed downwardly. It is also possible to arrange such that the direction of the spray can be controlled by allowing the spray nozzle 4 to swing vertically and horizontally.

In coating operation of the granulating/coating apparatus having the described construction, the material such as spherical granules are charged into the treating vessel 1 through a charging port which is not shown, and then the charging port is closed.

When the coated granule is required to have a core of slow-effecting or long-lasting type, the granule has, regardless of whether it is spherically shaped or irregularly shaped, a composition which contains 20 to 100 wt% of an inert carrier such as cane sugar, milk sugar, corn starch and crystal cellulose, solely or in the form of a mixture. A component which may be mixed with this carrier is a substance capable of adjusting the decaying speed or solubility of the carrier, such as carboxymethyl cellulose calcium, carboxymethyl cellulose sodium, D-mannitol, and other starches.

Then, a draft fan (not shown) is started so that the air flows as indicated by one-dot-and-dash line, whereby the spherical granules are blown up and fluidized within the granulating/coating chamber 8. The coating solution is sprayed from the nozzle 4 while the granules are fluidized. The coating solution is composed of a coating composition dissolved in a solvent which evaporates comparatively quickly. The coating solution is directed to the region where the spherical granules are fluidized uniformly at a high density.

When the coated granule to be produced is of slow-effecting or long-lasting type, the coating solution is formed by dissolving a medical agent which needs to be slow-effecting or long-lasting, such as a medical agent for cardiovascular system or an antibiotic, e.g., dipyridamole, in a solvent together with a component such as propylene glycol, polyethylene glycol, polyvinyl pyrolidone (PVP), polyvinyl alcohol (PVA), hydroxypropyl cellulose (HPC), hydroxypropylmethyl cellulose (HPMC), methyl cellulose (MC), ehyl cellulose (HC), carboxymethyl cellulose (CMEC), methacrylic acid/mithacrylic acid ester copolymer, alpha starch, dextrin, polysorbate 30, sorbitan mono fatty acid ester, cane sugar fatty acid ester, stearic acid polyoxyl 40 and so forth. As the solvent, an alcohol such as ethanol, an organic solvent such as methylene chloride, water and so forth are usable solely or as a mixture.

This operation is continued for a predetermined time so that the spherical granules are coated. Then, the exhaust damper 11 is closed so that the coated sphericl granules drop onto the air-flow stabilizing plate 7 and are accummulated thereon.

A discharge port (not shown) is provided in a lower portion of the side wall defining the granulating/coating chamber 8. This discharge port is usually closed by a stop valve (not shown).

The end of the air supply duct 5 remote from the granulating/coating chamber 8 is opened to the atmosphere, and a filter 12 for cleaning the air and a heater for heating the air are disposed in the air supply duct 5. The end of the exhaust duct 6 remote from the granulating/coating chamber 8 is connected to a draft fan (not shown) and the damper 11 mentioned above is disposed between the exhaust duct 6 and the chamber 10. The outlet of the draft fan is connected to a dust collector which is not shown.

In the described embodiment, only one spray nozzle is disposed at a predetermined portion of the downwardly-converging frusto-conical portion provided at the lower end portion of the treating vessel. The invention, however, does not exclude the use of a plurality of spray nozzles. Preferably, 2 to 3 spray nozzles are arranged at a constant pitch. The use of a plurality of spray nozzles arranged at a constant pitch contributes to the stabilization of the spray pattern.

During the operation of the apparatus, the air heated to a predetermined temperature is supplied through the air supply duct 5 into the cylindrical treating vessel 1 having the downwardly-converging frusto-conical portion, while sucking the air through the filter 3 and discharging the same through the exhaust duct 6, whereby the particles or granules in the treating vessel 1 are fluidized. Meanwhile, the binder or the coating solution is supplied to a predetermined region in the downwardly-converging frusto-conical portion of the treating vessel 1 (region A shown in FIG. 1) where the uniformly fluidized particles or granules exist at a high density, whereby the particles are formed into granules or the granules are coated.

An automatic control system for systematically controlling the whole apparatus is provided for the purpose of automatically controlling various conditions such as fluidizing conditions, e.g., flow rate and temperature of the fluidizing air and fluidizing time, granulating/coating conditions such as the supply rate and pressure of the binder or the coating solution and the time length of supply of such a binder or coating solution, and mixing and drying conditions.

An explanation will be given hereinunder as to another embodiment shown in FIG. 2 which is a sectional view of this embodiment. In this Figure, the same reference numerals are used to denote the same parts or members as those used in FIG. 1, and detailed description of such parts or members is omitted.

Figure 2:
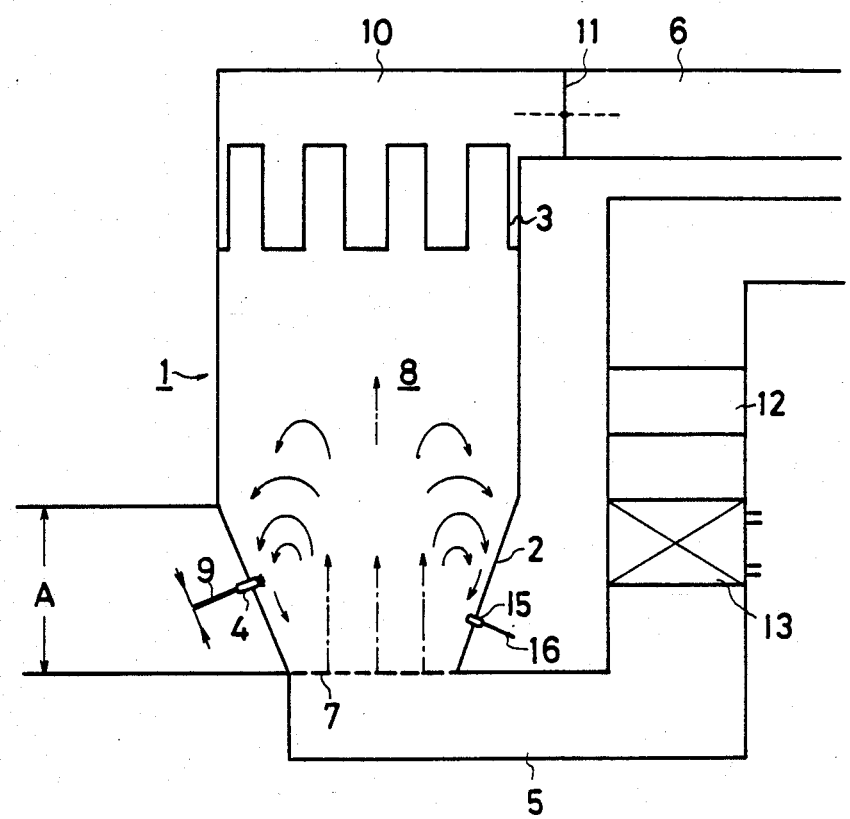
FIG. 2 is a sectional view of another embodiment of the present invention.

As in the case of the embodiment shown in FIG. 1, the embodiment shown in FIG. 2 is equipped with a spray nozzle 4 which is disposed below the interface of the fluidized particles or granules, i.e., at a predetermined portion within the region of the frusto-conical portion 2 (region A shown in FIG. 1). Although the spray nozzle in this embodiment is directed above the horizontal plane, such an orientation of the spray nozzle is not exclusive. In this embodiment, the treating vessel 1 is further provided with at least one compressed air nozzle 15 at a level below the interface of the fluidized particles or granules, more specifically at a portion within the region of the frusto-conical portion (region A in FIG. 2). In this embodiment, although not exclusive, the compressed air nozzle also is directed above the horizontal plane. The arrangement may be such that the compressed air nozzle 15 is provided on a portion of the wall of the treating vessel 1 at a level below the interface of the fluidized particles or granules, so as to direct the compressed air upwardly or downwardly, or may be such that the compressed air nozzle 15 swings so as to change the direction of the compressed air horizontally and vertically. Preferably but not exclusively, the number of the compressed air nozzles 15 ranges between 1 and 8. The number of the compressed air nozzles 15 may or may not coincide with the number of the spray nozles 4. Although the direction of the compressed air in the treating vessel may be unidirectional, it is preferred that compressed air is blown from a plurality of positions towards the center of the frusto-conical portion 2, because such an arrangement ensures high fluidity of the particles or the granules. The velocity of the compressed air is suitably selected within a range which effectively suppresses the generation of aggregation of the particles or granules. In general, the velocity of the compressed air ranges between 50 and 1000 m/sec, preferably between 100 and 600 m/sec.

By suitably controlling the flow velocity of the compressed air, it is possible to prevent excessive crushing of the granules, while avoiding undesirable aggregation of the same, whereby a high efficiency of coating operation is ensured.

In addition, the crushing effect produced by the compressed air can be adjusted by controlling the flow velocity of the compressed air, therby enabling the size of the granules to be controlled. This in turn permits the coating operation to be conducted immediately after the granulation, without requiring any classification according to the size.

The compressed air nozzle is connected through a conduit 16 to a heater, a compressed air generator and a controller which are not shown, and conditions such as the flow velocity, temperature and humidity of the compressed air, as well as the time of supply of the compressed air, are controlled automatically by means of a controller such as a computer.

In the operation of this embodiment, as in the case of the preceding embodiment, air heated to a predetermined temperature is supplied through the air supply duct 5 into the cylindrical treating vessel 1 having the frusto-conical portion 2, and the air is sucked through the filter 3 and discharged through the exhaust duct 6, whereby the particles or the granules in the treating vessel 1 are fluidized. Meanwhile, the compressed air is supplied to a predetermined portion within the region of the frusto-conical portion 2. At the same time, the binder or the coating solution is sprayed to the region of the downwardly-converging frusto-conical portion (region A in FIG. 1) where the uniformly fluidized particles or granules exist at a high density, so that the particles are formed into granules or the granules are coated with the coating composition. Conditions such as the flow velocity of the compressed air are controlled in the same manner as that in the preceding embodiment.

Although not described in detail, the the movable parts such as the damper are actuated by an electric motor or pneumatic pressure automatically under the control of the control system which systematically controls the whole part of the apparatus.

Figure 3:
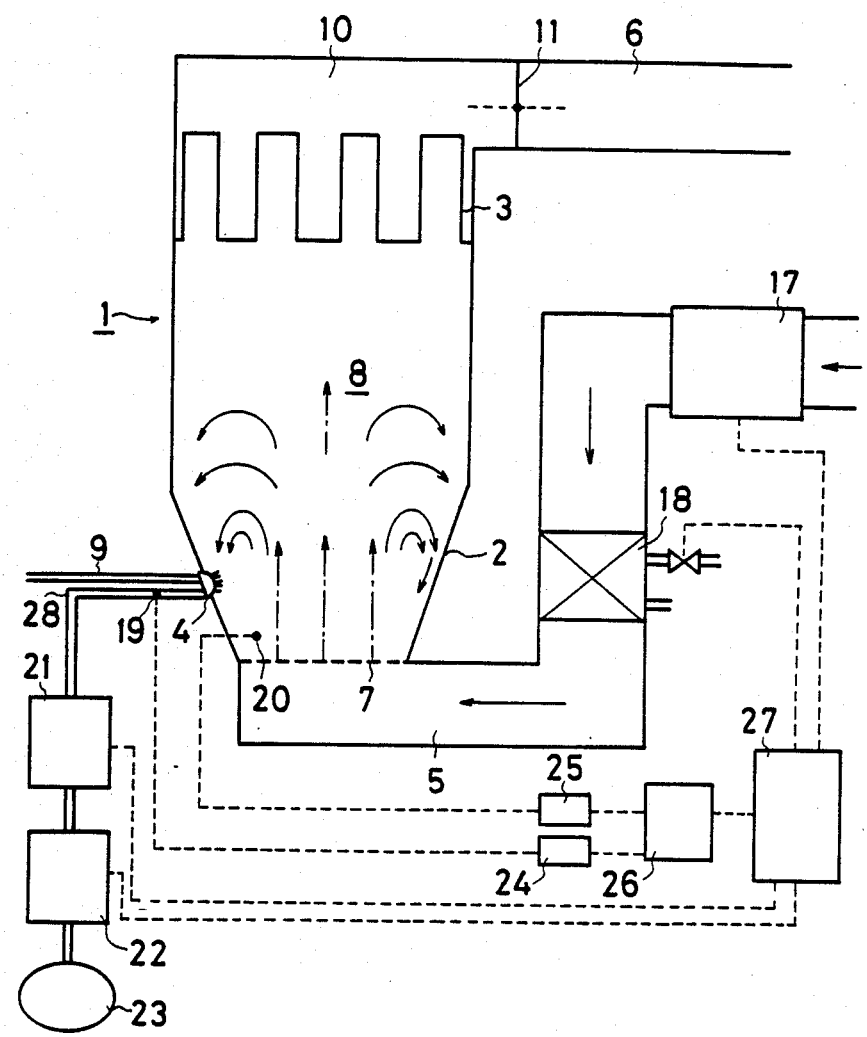
FIG. 3 is a sectional view of still another embodiment of the present invention.

FIG. 3 shows still another embodiment of the present invention. In this Figure, the same reference numerals are used to denote the same parts or members as those in the embodiment shown in FIG. 1, and the description of such parts or members is omitted.

As in the case of the preceding embodiments, the embodiment shown in FIG. 1 employs a spray nozzle 4 disposed at a level below the interface of the fluidized particles or granules. More specifically, the spray nozzle 4 is disposed within the region of the frusto-conical portion. The spray nozzle 4 is supplied with a binder or a coating solution delivered by a constant flow-rate pump (not shown) via a conduit 9. Another conduit 28 connected to the spray nozzle 4 is connected to a compressed air heater (or cooler) 21, a compressed air dehumidifier (or cooler) 22 and a compressor 23. Any water content in the air compressed by the air compressor 23 is removed as the air flows through the dehumidifier in which the compressed air is cooled down to a temperature of about −10° C. so as to be dehumidified. The dehumidified air is then heated (or cooled) by the heater (or cooler) 21. In this embodiment, a temperature sensing element 19, which is of an electric type for example, is disposed at a portion of the conduit 28 upstream of the treating vessel 1 or at a position which is close to the treating vessel 1 but not affected by the heat of the treating vessel 1. At the same time, a temperature sensing element 20 of, for example, an electric type is disposed in the fluidized bed of the particles within the granulating/coating chamber 8, preferably in the portion of the fluidized bed where the fluidized particles exist at a high density.

The temperature sensing element 19 is connected to a signal generator 24 which produces an electric signal corresponding to the sensed temperature. The signal generated by the signal generator 24 is read by a sensing controller 26 which in turn delivers a signal to a fluidized granulating and coating controller 27 which controls the operation of the whole apparatus. In response to the signal from the sensing controller 27, the fluidized granulating and coating controller 27 controls the heater (or cooler) 21 for the compressed air, so as to maintain the temperature of the compressed air at a predetermined level. The other temperature sensing element 20 is connected to another signal generator 25 the output signal of which is read by the sensing controller 26 mentioned above. The output signal from the sensing controller 26 is delivered to the fluidized granulating and coating controller 27. Although it is preferred to employ both the temperature sensing elements 19 and 20, an appreciable temperature control effect can be obtained even with one of these temperature sensing elements. More specifically, the information derived from the temperature sensing element disposed in the conduit 28 is used for the purpose of controlling the compressed air heater 21 and the air heater 18 for the fluidizing air, so as to control respective air temperatures. In this embodiment, the control of the heater 18 is conducted by adjusting the rate of supply of steam into the heater 18 by means of, for example, a valve. This, however, is not exclusive and the heat used in the heater 18 may be derived from other types of heat source such as an electrical heater. The binder or the coating solution is sprayed under the optimum condition from the spray nozzle 4 with the assist of the compressed air. At the same time, the fluidizing air is suitably controlled.

In the described embodiment, the fluidizing air and the compressed air are heated by the heaters 18 and 21. However, in some cases, it is necessary to cool the air, as in the case of the operation in hot summer season or as required by the property of the binder or the coating solution to be used. It is, therefore, preferred that the heaters 18 and 21 are constructed such that they can operate also as coolers, although it is possible to install coolers separate from the heaters and to use them selectively.

In general, the temperature controllable range between 0° and 100° C. provides a satisfactory result, although it depends on the nature of the material of the granule and the property of the binder or the coating solution.

Figure 4:
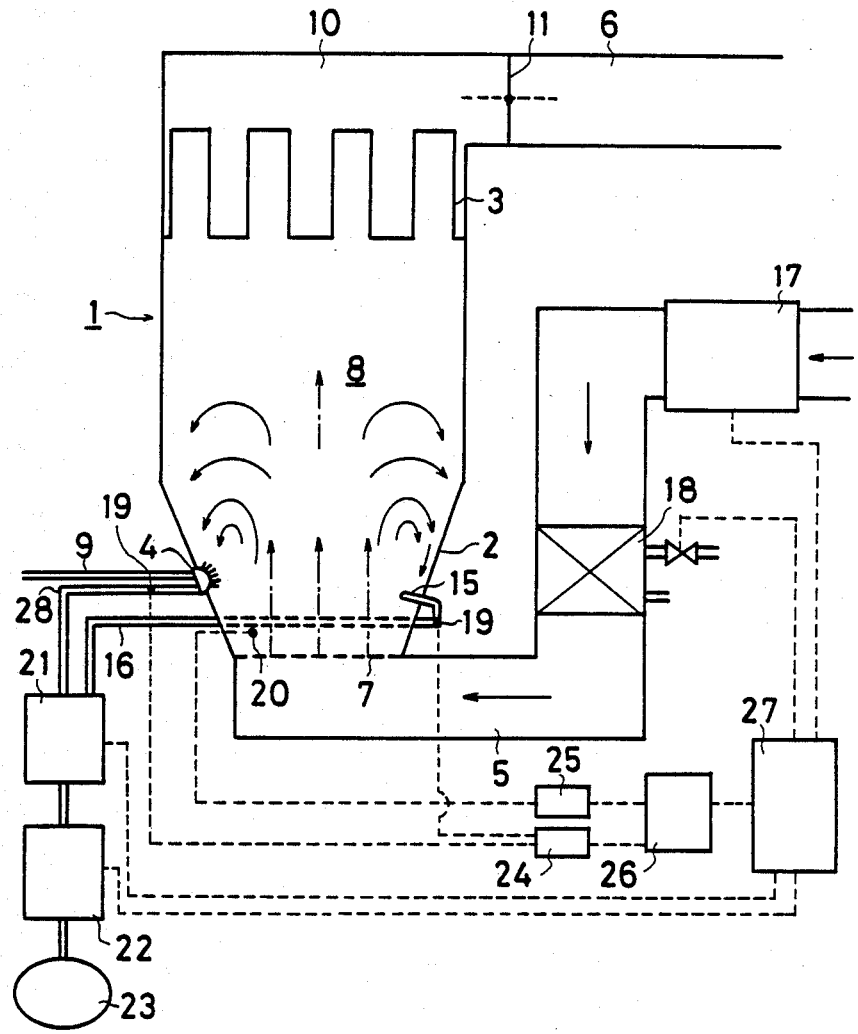
FIG. 4 is a sectional view of a further embodiment of the present invention.

FIG. 4 shows a further embodiment in which the temperature control system explained in connection with FIG. 3 is combined with the apparatus shown in FIG. 2. In this case, the temperature sensing element 19 is disposed in a conduit 16 connected to the compressed air nozzle, so as to attain a higher precision of the temperature control, although the provision of such a temperature sensing element is not essential.

A further embodiment of the invention will be explained hereinunder. In this embodiment, the spray nozzle may be provided at the upper central portion in the space within the treating vessel or on an upper portion of the wall of the same as in the case of the conventional apparatus or, alternatively, at the bottom portion of the treating vesel or below the air-flow stabilizing plate as in the cases of the preceding embodiment. Briefly, this embodiment of the fluidized granulating and coating apparatus has a cylindrical treating vessel having at least one spray nozzle, at least one air supply duct and one exhaust duct, and a downwardly converging frusto-conical portion, wherein the improvement comprises at least one compressed air nozzle disposed in the region of the frusto-conical portion below the interface of the fluidized particles.

Figure 5:
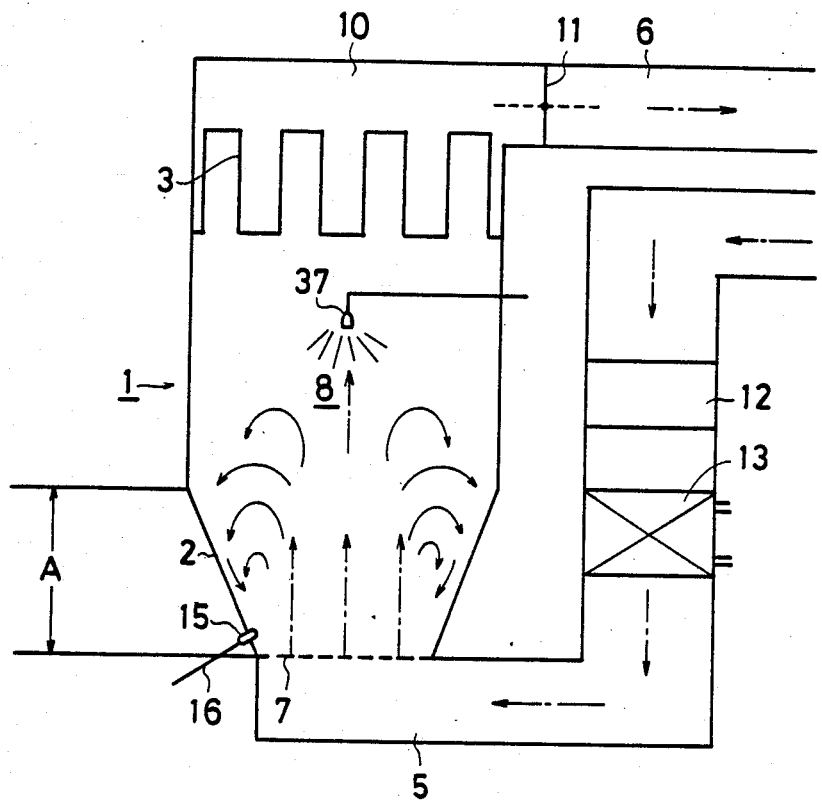
FIG. 5 is a sectional view of a still further embodiment of the present invention.

This embodiment will be described hereinunder with specific reference to FIGS. 5 and 6 in which the same reference numerals are used to denote the same parts or members appearing in FIGS. 2, 4 and 7.

In this embodiment, at least one compressed air nozzle 15 is disposed in the region of the frusto-conical portion (region A) below the interface of the fluidized particles or spherical granules. Although not exclusive, the compressed air nozzle is directed to aim at a point above the horizontal plane also in this embodiment. For instance, the compressed air nozzle 15 is secured to a portion of the wall of the treating vessel 1 below the interface of the fluidized particles or granules. Although not exclusive, the number of the compressed air nozzles ranges between 1 and 8. A constant and uniform fluidized bed of the particles or spherical granules can be formed by providing a plurality of compressed air nozzles at a constant pitch. A uniform fluidized bed can be formed even if the compressed air nozzles are not arranged at a constant pitch, provided that the pressure and flow rate of the air are controlled suitably.

Although this embodiment can be successfully carried out by a single compressed air nozzle 15 which produces a unidirectional flow of air, it is preferred to use a plurality of compressed air nozzles 15 such that compressed air is blown from a plurality of points towards the center of the frusto-conical portion 2 of the treatng vessel 1, in order to sufficiently fluidize the particles or spherical granules. The flow velocity of the compressed air may be suitably selected within a range which does not cause any aggregation of the spherical granules. In general, the velocity of the compressed air ranges between 50 and 1000 m/sec, preferably between 100 and 600 m/sec.

The control of the flow velocity of the compressed air contrinutes to the suppression of excessive crushing of the granules, while avoiding aggregation of the same, thus ensuring a high granulating and coating efficiency.

During the granulating operation of this apparatus, the flow velocity of the compressed air can be varied so as to control the crushing effect of the compressed air, thereby allowing the size of the ganules to be controlled. This in turn makes it possible to effect the coating immediately after the granulation, without necessitating classification of the granules according to the size.

Figure 6:
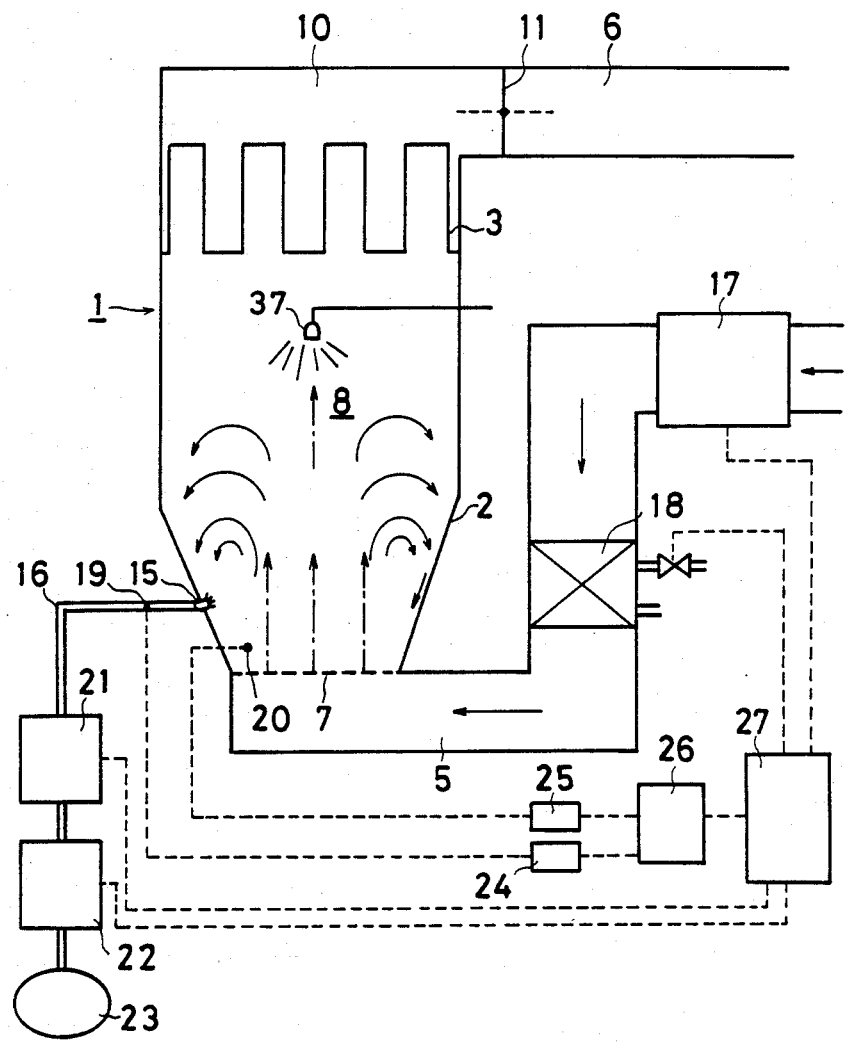
FIG. 6 is a sectional view of a still further embodiment of the present invention.

As will be seen from FIG. 6, the compressed air nozzle 15 is connected through te conduit 16 to the heater (or cooler) 21, compressed air source 22, and the controller 27. The flow velocity, temperature and humidity of the cmpressed air are controlled in accordance with the condition of operation of the whole apparatus.

With the arrangement described above, it is possible to effectively prevent aggregation of the particles or granules, regardless of the position of the spray nozzle, by a suitable control of the flow rate and pressure of the air from the compressed air nozzle.

(Effect of the Invention)

By virtue of the structural features explained hereinbefore, the present invention offers the following advantages.

(1) It is possible to complete the coating at a high efficiency and in a short time, because the drying and scattering of the sprayed coating solution are suppressed remarkably.

(2) A high coating efficiency is attained specifically for spherical granules, and production of coated spherical granules of a high quality and homogeneity is possible at a high yield. This features is advantageous particularly in the coating with a pharmaceutical coating layer of slow-effecting or long-lasting type on an inert core.

(3) Aggregation is suppressed during granulating and coating operation.

(4) Deposition of the fine matters to the spray nozzle is completely eliminated.

(5) In case of granulating operation, the grain size can be controlled as defined because the operation is not substantially affected by the size of the granule. This in turn eliminates the necessity for the sorting of the granules according to the size.

The high coating efficiency and high effect for preventing the aggregation offered by the present invention have been confirmed through experiments which will be described hereinunder.

EXAMPLE 1

8000 g of spherical granules of sizes ranging between 32 and 42 meshes (495 and 350 μm) was charged in the apparatus shown in FIG. 4. The granules were fluidized by the fluidizing air supplied at a rate of 6 to 9 m$^3$/min and at a temperature of 50° C. 35000 g of coating solution was sprayed into the fluidized bed at a rate of 100 to 200 g/min, with the assist by the atomizing air which was supplied at a pressure of 3 to 4.5 kg/cm$^2$ and a flow rate of 250 to 300 l/min and a temperature of 40° to 50° C., thereby coating the fluidized spherical granules. The coating solution was prepared by dissolving, in 80 parts of a solution consisting of a methanol-methylene chloride mixture, 9 parts of an active substance, 9 parts of methacrylic acid-methylmetacrylate copolymer, and 2 parts of polysorbate 80. During the operation, compressed air was supplied at a velocity of 150 m/sec.

The rate of deposition of the coating composition on the spherical granules, i.e., the coating rate, was as high as 97%, and a high degree of uniformity of the coating was confirmed. The rate of generation of aggregates, in terms of the ratio of the granules left on a 24-mesh sieve, was as small as 2%. The rate of generation of aggregates was increased to 5% when the supply of the compressed air from the compressed air nozzle was not employed.

Figure 7:
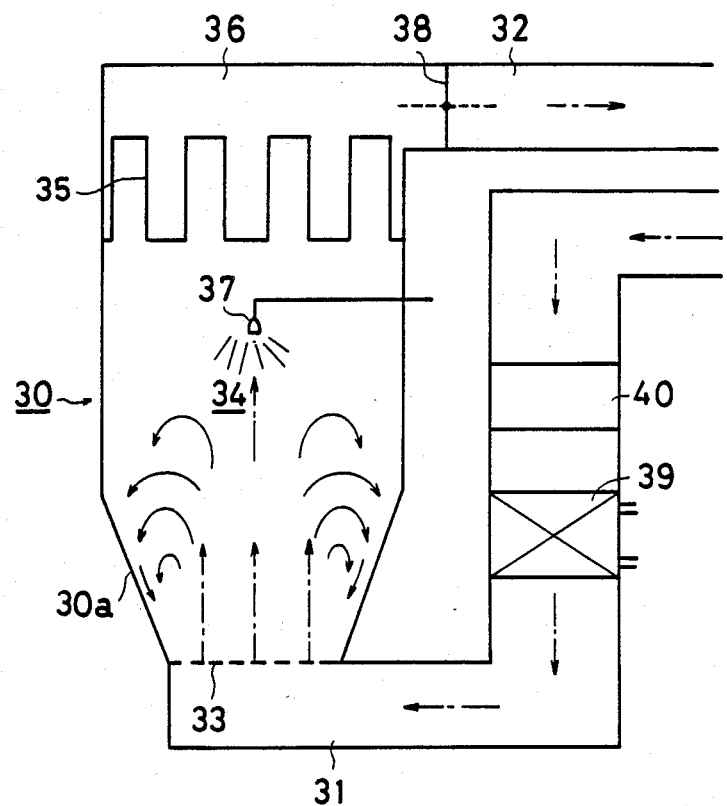
FIG. 7 is a sectional view of a conventional fluidized granulating and coating apparatus.

For the purpose of comparison, experimental coating operation was conducted with the conventional apparatus shown in FIG. 7, using the same spherical granules. The granules were fluidized under the same fluidizing conditions. Meanwhile, 35000 g of the same coating solution as that mentioned above was supplied at a rate of 100 to 200 g/min, with the assist by the atomizing air of a pressure of 3 to 4.5 Kg/cm$^2$ supplied at a rate of 250 to 300 l/min. In this case, the spray nozzle was immersed in the fluidized bed of the spherical granules, in order to obtain a high coating effect. As a result, a coating efficiency of 85% and a rate of generation of aggregates of 11% were obtained.

EXAMPLE 2

8000 g of spherical granules of sizes ranging between 32 and 42 meshes (495 and 350 μm) was charged in the apparatus shown in FIG. 4. The granules were fluidized by the fluidizing air supplied at a rate of 6 to 9 m$^3$/min and a a temperature of 40° C. 50000 g of coating solution was sprayed into the fluidized bed at a rate of 100 to 350 g/min, with the assist by the atomizing air which was supplied at a pressure of 3 to 4.5 Kg/cm$^2$, flow-rate of 250 to 300 l/min and a temperature of 30° to 45° C., thereby coating the fluidized spherical granules. The coating solution was prepared by dissolving, in 85 parts of a solution consisting of a methanol-methylene chloride mixture, 6 parts of an active substance, 8 parts of hydroxypropylmethylcelulose, and 1 part of macrogol 400 and 600. During the operation, compressed air was supplied at a velocity of 150 m/sec.

The rate of deposition of the coating composition on the spherical granules, i.e., the coating rate, was as high as 99%, and a high degree of uniformity of the coating was confirmed. The rate of generation of aggregates was as small as 2%. The rate of generation of aggregates was increased to 4% when the supply of the compressed air from the compressed air nozzle was not employed.

For the purpose of comparison, experimental coating operation was conducted with the conventional apparatus shown in FIG. 7, using the same spherical granules. The granules were fluidized under the same fluidizing conditions. Meanwhile, 50000 g of the same coating solution as that mentioned above was supplied at a rate of 100 to 350 g/min, with the assist by the atomizing air of a pressure of 3 to 4.5 Kg/cm$^2$ supplied at a rate of 250 to 300 l/min. In this case, the spray nozzle was immersed in the fluidized bed of the spherical granules, in order to obtain a high coating effect. As a result, a coating efficiency of 80% and a rate of generation of aggregates of 9% were obtained.

EXAMPLE 3

15000 g of spherical granules of sizes ranging between 24 and 42 meshes (700 and 350 μm) was charged in the apparatus shown in FIG. 4. The granules were fluidized by the fluidizing air supplied at a rate of 6 to 9 m$^3$/min and a temperature of 30° C. 50000 g of coating solution was sprayed into the fluidized bed at a rate of 100 g/min, with the assist by the atomizing air which was supplied at a pressure of 3 Kg/cm$^2$, flow-rate of 250 l/min and a temnperature of 5° C., thereby coating the fluidized spherical granules. The coating solution was prepared by dissolving, in 90 parts of a solution consisting of a methanol-methylene chloride mixture, 9 parts of polymer of ethylacrylate methylmethacrylate and trimethylammonioethyl methacrylatechloride, and 1 part of macrogol 400. During the operation, compressed air was supplied at a velocity of 150 m/sec.

The rate of deposition of the coating composition on the spherical granules, i.e., the coating rate, was as high as 96%, and a high degree of uniformity of the coating was confirmed. The rate of generation of aggregates, interms of the rate of the granules left on a 20-mesh sieve, was as small as 1%. The coating layer was uniform and the surface of the coating layer was smooth. The rate of generation of aggregates was increased to 3% when the supply of the compressed air from the compressed air nozzle was not employed.

For the purpose of comparison, experimental coating operation was conducted with the conventional apparatus shown in FIG. 7, using the same spherical granules. The granules were fluidized under the same fluidizing conditions. Meanwhile, 50000 g of the same coating solution as that mentioned above was supplied at a rate of 100 g/min, with the assist by the atomizing air of a pressure of 3 Kg/cm$^2$ supplied at a rate of 250 l/min. In this case, the spray nozzle was immersed in the fluidized bed of the spherical granules, in order to obtain a high coating effect. As a result, a coating efficiency of 75% and a rate of generation of aggregates of 6% were obtained. The surface of the coated granules was rather rough and the coating layer was not uniform.

What is claimed is:

1. A fluidized granulating and coating method comprising: charging a cylindrical treating vessel having a downwardly converging frusto-conical portion with material particles;
   supplying air into said treating vessel through an air supply duct while sucking air from said treatment vessel through an exhaust duct so as to fluidize said particles;
   supplying compressed air to a spray nozzle and spraying a solution through said spray nozzle to a zone near a wall of said frusto-conical portion where the fluidized particles exist at a high density, at a level below the interface of the fluidized particles and within the region of said frusto-conical portion;

sensing the temperature of the fluidized particles and separately controlling the temperature of the air supplied through said supply duct and said spray nozzle as a function of said sensed temperature, thereby forming granules.

2. A fluidized granulating and coating method in accordance with claim 1 wherein the particles are spherical granules and coating solution is sprayed so as to coat said spherical granules.

3. A fluidized granulating and coating method in accordance with claim 2 wherein said coating solution contains a medical component.

4. A fluidized granulating and coating method comprising: charging a cylindrical treating vessel having a downwardly converging frusto-conical portion with material particles, supplying air into said treating vessel through an air supply duct while sucking air from said treatment vessel through an exhaust duct so as to fluidize said particles, supplying compressed air to a spray nozzle independently of said air supplied through said duct, said spray nozzle being disposed within said frusto-conical portion at a level below the interface of the fluidized particles and within the region of said frusto-conical portion, spraying a binder or coating solution through said spray nozzle, and sensing the temperature of the fluidized particles and separately controlling the temperature of the air supplied through said supply duct and said compressed air as a function of said sensed temperature, thereby forming granules from said particles or coating granules.

5. A fluidized granulating and coating method in accordance with claim 4 wherein the particles are spherical granules and said coating solution is sprayed so as to coat said spherical granules.

6. A fluidized granulating and coating method in accordance with claim 5 wherein said coating solution contains a medical component.

7. A fluidized granulating and coating method comprising: charging a cylindrical treating vessel having a downwardly converging frusto-conical portion with material particles, supplying air into said treating vessel through an air supply duct while sucking air from said treatment vessel through an exhaust duct so as to fluidize said particles, spraying a binder or a coating solution, and supplying compressed air independently of said binder or coating solution to the zone near a wall of said frusto-conical portion where the fluidized particles exist at a high density, at a level below the interface of the fluidized particles and within the region of said frusto-conical portion, sensing the temperature of the fluidized particles and separately controlling the temperature of the air supplied through said supply duct and said compressed air as a function of said sensed temperature, thereby forming granules from said particles or coating granules.

8. A fluidized granulating and coating method in accordance with claim 7 wherein said coating solution contains a medical component.

9. A fluidized granulating and coating apparatus having a cylindrical treating vessel provided with at least one spray nozzle, at least one air supply duct and one exhaust duct, and a downwardly converging frusto-conical portion, said spray nozzle being disposed at a position below the interface of the fluidized particles within the region of said frusto-conical portion, means for sensing the temperature of the fluidizing particles and means for separately controlling the temperature of the compressed air supplied to said spray nozzle and the temperature of the air from said supply duct in accordance with the result of the sensing of the temperature of the fluidized particles.

10. A fluidized granulating and coating apparatus in accordance with claim 9 wherein the coating is effected by a composition containing a medical component.

11. A fluidized granulating and coating apparatus according to claim 10 wherein said particles are spherical granules.

12. A fluidized granulating and coating apparatus having a cylindrical treating vessel provided with at least one spray nozzle, at least one air supply duct and one exhaust duct, and a downwardly converging frusto-conical portion, said spray nozzle being disposed at a position below the interface of the fluidized particles within the region of said frusto-conical portion, a compressed air nozzle disposed at a level below the interface of the fluidized particles and within the range of the frusto-conical portion, means for sensing the temperature of the fluidizing particles and means for separately controlling the temperature of the compressed air supplied to said spray nozzle and the temperature of the air supplied in said supply duct in accordance with the result of the sensing of the temperature of the fluidized particles.

13. A fluidized granulating and coating apparatus having a cylindrical treating vessel provided with at least one spray nozzle, at least one air supply duct and one exhaust duct, and a downwardly converging frusto-conical portion characterized in that a compressed air nozzle is disposed at a level below the interface of the fluidized particles and within the range of said frusto-conical portion and the temperature of compressed air supplied to said compressed air nozzle and the temperature of air supplied to said supply duct are separately controlled in accordance with the result of sensing (1) the temperature of the air in a compressed air supply conduit and/or (2) the temperature of the fluidized particles.

* * * * *